United States Patent [19]

Margolis et al.

[11] Patent Number: 4,861,607

[45] Date of Patent: Aug. 29, 1989

[54] REMOVAL OF XANTHINE STIMULANTS FROM COCOA

[75] Inventors: Geoffrey Margolis, Bussigny; Jacky Chiovini, Daillens, both of Switzerland; Fulvio A. Pagliaro, Marysville, Ohio

[73] Assignee: Nestec S. A., Vevey, Switzerland

[21] Appl. No.: 672,207

[22] Filed: Nov. 16, 1984

Related U.S. Application Data

[63] Continuation of Ser. No. 478,252, Mar. 24, 1983, abandoned, which is a continuation of Ser. No. 288,741, Jul. 31, 1981, abandoned, which is a continuation-in-part of Ser. No. 245,924, Mar. 20, 1981, abandoned.

[51] Int. Cl.$^4$ ............................................. A23G 1/00
[52] U.S. Cl. ................................. 426/481; 426/427; 426/428; 426/593
[58] Field of Search ............... 426/427, 428, 481, 321, 426/593

[56] References Cited

U.S. PATENT DOCUMENTS

| | | | |
|---|---|---|---|
| 1,073,441 | 9/1913 | Riddle | 426/593 |
| 1,925,326 | 9/1933 | Kellogg et al. | 426/593 X |
| 3,806,619 | 4/1974 | Zosel | 426/478 |
| 3,843,824 | 10/1974 | Roselius et al. | 426/478 X |
| 3,879,569 | 4/1975 | Vitzthum et al. | 426/427 |
| 3,923,847 | 12/1975 | Roselius et al. | 260/412.8 |
| 4,160,042 | 7/1979 | Farr et al. | 426/427 X |
| 4,167,589 | 9/1979 | Vitzhum et al. | 426/312 |
| 4,168,324 | 9/1979 | Roselius et al. | 426/312 X |
| 4,246,291 | 1/1981 | Prasod et al. | 426/427 X |
| 4,247,570 | 1/1981 | Zosel | 426/427 X |
| 4,251,559 | 2/1981 | Margolis et al. | 426/427 X |
| 4,255,458 | 3/1981 | Roselius et al. | 426/427 X |
| 4,260,639 | 4/1981 | Zosel | 426/478 |
| 4,276,315 | 6/1981 | Katz etal. | 426/427 X |
| 4,279,937 | 7/1981 | Strobel et al. | 426/428 |

FOREIGN PATENT DOCUMENTS 446398  1/1948  Canada ............................ 544/275

*Primary Examiner*—Joseph Golian
*Attorney, Agent, or Firm*—Vogt & O'Donnell

[57] ABSTRACT

Xanthine stimulants are extracted from a cocoa material containing a fat by adding water to the cocoa material for swelling it with at least 0.1 part by weight of water per part by weight of cocoa. The swollen material is then contacted with a food-acceptable solvent gas which is supercritical in respect to temperature and pressure, after which the solvent gas containing the stimulants is separated from the swollen cocoa material which thereupon has a reduced content of stimulants.

12 Claims, No Drawings

REMOVAL OF XANTHINE STIMULANTS FROM COCOA

CROSS REFERENCE TO RELATED APPLICATIONS

This is a continuation of Application Serial No. 478,252, filed Mar. 24, 1983, now abandoned, which in turn is a continuation of Application Serial No. 288,741, filed July 31, 1981, now abandoned, which in turn is a continuation-in-part of Application Serial No. 245,924, filed Mar. 20, 1981, now abandoned.

BACKGROUND OF THE INVENTION

The present invention relates to the extraction of xanthine stimulants from cocoa, more especially from a cocoa material swollen by adding water.

Cocoa contains certain methyl-substituted xanthines such as theobromine and caffeine which have stimulating properties, and it is often desirable to prepare a cocoa product substantially free from such substances. In this invention, these stimulating substances are referred to as xanthine stimulants.

U.S. Pat. No. 3 923 847 describes and claims a method for the production of cocoa butter from cocoa mass or from roasted or unroasted cocoa nibs comprising the step of contacting said cocoa product with a food-acceptable solvent gas which is supercritical in respect of temperature and pressure for extraction of said cocoa butter by the solvent gas, and removing the solvent gas bearing the cocoa butter from the residue of said cocoa product.

There is only a very small fraction of water naturally present in the cocoa and no water is used in the process of the above mentioned patent. We have repeated the process described and have found that less than 1% of the xanthine stimulants is extracted with the cocoa butter. Suprisingly, we have now found that by carrying out a similar process but using a cocoa material which has been swollen by adding at least 0.1 part by weight of water per part by weight of cocoa product, the amount of cocoa butter extracted is very small whereas a large proportion of the xanthine stimulants is extracted.

SUMMARY OF THE INVENTION

Accordingly, the present invention provides a process for extracting xanthine stimulants from a cocoa material which comprises contacting the cocoa material swollen with at least 0.1 part by weight of water per part by weight of cocoa with a food-acceptable solvent gas which is supercritical in respect of temperature and pressure and separating the solvent gas containing the xanthine stimulants from the swollen cocoa material having a reduced content of xanthine stimulants. The term "reduced content" in the present context is intended to cover zero content.

The food-acceptable supercritical solvent gas is moistened by the water present in the swollen cocoa material but if desired, it may be moistened with a little water before contacting the swollen cocoa material.

The term "supercritical" as used herein denotes that the temperature is above the critical temperature and the pressure is above the critical pressure. A variety of food-acceptable supercritical gases may be used, for example, nitrous oxide, and the critical data are available in the literature. However, it is preferred to use supercritical carbon dioxide for which the temperature is above the critical temperature of 31.3° C. and the pressure is above the critical pressure of 73.8 bar.

DESCRIPTION OF THE PREFERRED EMBODIMENTS

The cocoa material may be any cocoa-containing mass, for example, roasted cocoa nibs or even the ground shells of cocoa beans, but is preferably the green, ground, unroasted cocoa nibs formed by cleaning, cracking and winnowing the cocoa beans to remove filth, germs and most of the shell material, followed by grinding.

The cocoa material may be swollen by adding preferably from 0.2 to 1.5 parts and especially from 0.4 to 0.7 parts by weight of water per part by weight of cocoa material. Warm water, water vapour or a mixture of warm water and water vapour may conveniently be used to swell the cocoa material. The temperature of the water added is preferably above 70° C. and the mixture is allowed to swell for a period of time for example, from 30 minutes to 2 hours, preferably under conditions of agitation.

The cocoa material is preferably swollen by an amount from 20 to 55% and especially from 35 to 45%.

The solubility of the xanthine stimulants in the supercritical gas depends on its temperature and pressure. By adjusting these two latter parameters it is possible to achieve the optimum efficiency.

The extraction should be carried out at a temperature sufficiently high to achieve extraction in the shortest time but below the temperature where roasting of the cocoa occurs. The temperature is conveniently up to 120° C. and preferably from 80° to 100° C.

The extraction is conveniently carried out at a pressure above 80 bars and preferably from 250 to 350 bars. Although higher pressures may be used, for example, 500 bars or more, the maximum pressure is usually limited by the economics of the process.

The contact of the swollen cocoa material with the supercritical gas may be effected in a single cell or other piece of equipment providing for intimate fluid contact and separation of two phases, or in two or more cells for a countercurrent process. The extraction is carried out in a closed system.

Preferably, provision is made for regenerating the supercritical gas by the removal of substantially all of the xanthine stimulants taken up by it. The regenerated supercritical gas preferably contains as little xanthine stimulant as possible and it can be used to contact fresh cocoa material, for example, by recycling in a closed system. The xanthine stimulants may, for instance, be precipitated by rendering them insoluble in the supercritical gas by adjusting the temperature and/or pressure. However, the xanthine stimulants are preferably removed from the supercritical gas by washing with water or by adsorption on active charcoal. In the washing step, the supercritical gas containing the xanthine stimulants is contacted with water, for example, in a packed column or other piece of equipment providing for intimate fluid-fluid contact conveniently in a continuous countercurrent manner, and the aqueous solution of xanthine stimulants is separated for recovery of the xanthine stimulants, for example, by evaporation. If the xanthine stimulants are removed by adsorption on active charcoal, the supercritical gas containing the xanthine stimulants conveniently flows through a column containing active charcoal which may be moistened if desired, preferably with from 30 to 50% by weight of water.

If desired, the xanthine stimulants may be recovered from the active charcoal by solvent extraction, for example with a chlorinated hydrocarbon such as methylene dichloride.

The removal of the xanthine stimulants from the supercritical gas may be carried out within the same range of temperature and pressure as are employed in the extraction of the xanthine stimulants from the cocoa material and is preferably carried out at the same temperature and pressure as the extraction. The regenerated supercritical gas substantially free of xanthine stimulants may then be used to contact a fresh batch of cocoa material.

After the swollen cocoa material having a reduced content of xanthine stimulants has been separated, it may be dried before being subjected to roasting and the further stages of cocoa technology.

EXAMPLES

The following Examples further illustrate the present invention.

EXAMPLE 1

400 grams of green unroasted cocoa nibs containing 1.37% theobromine were swollen with 260 grams of water at 80° C. for 1 hour to obtain an increase in moisture of 40%.

The swollen nibs were put in a cell through which supercritical carbon dioxide flowed at a temperature of 90° C. and a pressure of 300 bar. The carbon dioxide was freed from the theobromine by passing through a column of active charcoal containing 40% by weight of water. After six hours treatment the cocoa material was taken out of the cell and dried. The content of theobromine in the cocoa was found to be 0.15%, that is, an 89% reduction. There was no loss of fatty material.

EXAMPLE 2

10 kilograms of green unroasted cocoa nibs containing 1.37% theobromine were swollen with 4.25 kilograms of water at 80° C. for 1 hour to obtain an increase in moisture of 30%. The swollen cocoa nibs were put in a cell through which supercritical carbon dioxide flowed at a temperature of 90° C. and a pressure of 300 bars for 2 hours. The carbon dioxide was freed from the theobromine by passing through a column of active charcoal containing 40% by weight of water. The cocoa was removed and dried and the content of theobromine was found to be 0.39%, that is, a 71% reduction. There was no loss of fatty material.

EXAMPLE 3

400 grams of green unroasted cocoa nibs containing 1.37% theobromine were swollen with 260 grams of water at 80° C. for 1 hour to obtain an increase in moisture of 40%.

The swollen cocoa nibs were extracted in three cells, each holding 40 grams, through which supercritical carbon dioxide flowed at a temperature of 90° C. and a pressure of 300 bar. The carbon dioxide was freed from the theobromine by passing through a column of active charcoal containing 40% by weight of water. After 6 hours extraction during which the cells were changed every 2 hours, the cocoa was removed and dried and was found to have a theobromine content of 0.04%, that is, a reduction of 97%. There was no loss of fatty material.

EXAMPLE 4

By following an identical procedure to that described in Example 2 but using cocoa nibs containing 1.399% theobromine instead of 1.37%, the content of theobromine was reduced to 0.361%, that is a 74.2% reduction. In this Example the caffeine content was also measured and it was found to have been reduced by the process from 0.070% to zero.

We claim:

1. A process for extracting xanthine stimulants from a cocoa material containing a fat which comprises adding water to the cocoa material for swelling it with at least 0.1 part by weight of water per part by weight of cocoa, contacting the swollen cocoa material with a food-acceptable solvent gas which is supercritical in respect to temperature and pressure and separating the solvent gas containing the xanthine stimulants from the swollen cocoa material having a reduced content of xanthine stimulants.

2. A process according to claim 1 in which the food-acceptable solvent gas is supercritical carbon dioxide.

3. A process according to claim 1 or claim 2 in which the cocoa material consists of green, ground unroasted cocoa nibs.

4. A process according to claim 1 or claim 2 in which the cocoa material is swollen by adding from 0.4 to 0.7 parts by weight of water per part by weight of cocoa material.

5. A process according to claim 1 or claim 2 in which the contacting step is carried out at a temperature of from 80° C. to 120° C.

6. A process according to claim 5 in which the contacting step is carried out at a pressure of from 250 to 500 bars.

7. A process according to claim 1 further comprising regenerating the supercritical gas by removing substantially all of the xanthine stimulants taken up by it.

8. A process according to claim 7 in which the xanthine stimulants are removed from the supercritical gas by washing with water to form an aqueous solution of the xanthine stimulants.

9. A process as claimed in claim 8 in which the xanthine stimulants are recovered from the aqueous solution by evaporation.

10. A process according to claim 7 in which the xanthine stimulants are removed from the supercritical gas by adsorption on active charcoal moistened with from 30 to 50% by weight of water.

11. A process according to any of claims 7 to 10 in which the removal of the xanthine stimulants from the supercritical gas is carried out at the same temperature and pressure as are employed in the contacting step.

12. A process according to claim 7 in which the regenerated supercritical gas is used to contact a fresh batch of cocoa material.

* * * * *